(12) United States Patent
Carroll

(10) Patent No.: US 11,878,881 B1
(45) Date of Patent: Jan. 23, 2024

(54) HOSE MANIPULATION IMPLEMENT

(71) Applicant: Jay B. Carroll, Pie Town, NM (US)

(72) Inventor: Jay B. Carroll, Pie Town, NM (US)

(*) Notice: Subject to any disclaimer, the term of this patent is extended or adjusted under 35 U.S.C. 154(b) by 674 days.

(21) Appl. No.: 17/082,536

(22) Filed: Oct. 28, 2020

Related U.S. Application Data

(60) Provisional application No. 62/927,620, filed on Oct. 29, 2019.

(51) Int. Cl.
*B65G 7/12* (2006.01)
*A62C 33/04* (2006.01)

(52) U.S. Cl.
CPC ............... *B65G 7/12* (2013.01); *A62C 33/04* (2013.01)

(58) Field of Classification Search
CPC .................................. A62C 33/04; B65G 7/12
USPC ........................................................... 294/118
See application file for complete search history.

(56) References Cited

U.S. PATENT DOCUMENTS

| | | | | |
|---|---|---|---|---|
| 25,709 A | * | 10/1859 | Allen et al. | |
| 297,788 A | * | 4/1884 | Green | |
| 554,461 A | * | 2/1896 | Schrantz | |
| 1,970,087 A | * | 8/1934 | Gonsalves | A01C 5/02 D8/4 |
| 2,442,698 A | * | 6/1948 | Lang | B65G 7/12 294/117 |
| 2,789,006 A | * | 4/1957 | Mattson | B65G 7/12 294/106 |
| 3,007,734 A | * | 11/1961 | Terry | A45F 5/10 294/119 |
| 4,063,767 A | * | 12/1977 | Hardin | F16L 3/16 294/16 |
| 4,838,465 A | * | 6/1989 | Metzger | E04G 21/04 222/526 |
| 4,929,010 A | * | 5/1990 | Lahti | B25B 9/00 47/76 |
| 5,114,199 A | * | 5/1992 | Newcomer | A01B 1/00 294/50.8 |
| 6,276,732 B1 | * | 8/2001 | Hauss | B66F 19/005 294/16 |
| 7,478,853 B1 | * | 1/2009 | Payette | A01G 9/088 294/16 |

* cited by examiner

*Primary Examiner* — Dean J Kramer
(74) *Attorney, Agent, or Firm* — QuickPatents; Kevin Prince

(57) ABSTRACT

An implement for a person to manipulate a hose includes two elongated members each having a top end, a bottom end, and a pivot aperture traversing through the elongated member. A pivot rod traverses the pivot apertures of each elongated member such that each elongated member is pivotally joined at the pivot rod. A two-part hose holder comprises two elongated arcuate members each fixed with the bottom end of one of the elongated members such that concave surfaces of each elongated arcuate member are mutually opposingly disposed. The top end of each elongated member further includes at least one handle projecting orthogonally away therefrom. In use, the elongated members may be pulled mutually apart to open the two-part hose holder to at least partially encircle the hose, whereupon the elongated members are then pushed together to close the two-part hose holder about the hose to engage the hose.

6 Claims, 6 Drawing Sheets

HOSE MANIPULATION IMPLEMENT

CROSS-REFERENCE TO RELATED APPLICATIONS

This application claims the benefit of U.S. Provisional Patent Application 62/927,620, filed on Oct. 29, 2019, and is incorporated herein by reference.

STATEMENT REGARDING FEDERALLY SPONSORED RESEARCH AND DEVELOPMENT

Not Applicable.

FIELD OF THE INVENTION

This invention relates to hoses, and more particularly to an implement for handling and manipulating septic and similar hoses.

BACKGROUND

Septic hoses, concrete delivery hoses, fire hoses, and the like can be heavy when being used, and as such are difficult to position and otherwise manipulate. A worker typically has to bend down, grasp the hose, and then pull or push it into a desired location while the hose is in-use, often with heavy fluid or slurry flowing through the hose. As a result, back fatigue and injuries are common with such workers.

Therefore, there is a need for a device that allows a septic, concrete or fire hose to be manipulated even when a material is flowing through the hose. Such a needed invention would allow a person to manipulate the position and orientation of the hose without stooping or bending over. The needed device would further be strong, well-suited for gripping the hose, and would have a means by which to adjust the height of the implement to fit the user. The present invention accomplishes these objectives.

SUMMARY OF THE INVENTION

The present device is an implement for a person to manipulate a hose, such as a septic hose. The implement provides for the person to manipulate the hose in such a way as to not being required to bend down or stoop to engage the hose with the implement.

Two elongated members each have a top end, a bottom end, and a pivot aperture traversing through the elongated member. Preferably each elongated member further includes a telescoping portion between the top end and the pivot aperture thereof. A pivot rod traverses the pivot apertures of each elongated member such that each elongated member is pivotally joined at the pivot rod.

A two-part hose holder comprises two elongated arcuate members each fixed with the bottom end of one of the elongated members such that concave surfaces of each arcuate member are mutually opposingly disposed. In some embodiments the two-part hose holder, when engaged with the hose, the two-part hose holder and the bottom end of each of the elongated members are flush at a bottom side of the implement, such that the implement can stand upright on a horizontal support surface. Preferably each elongated member is angled proximate the pivot aperture thereof such that when the two-part hose holder is engaged with the hose, the top ends of the elongated members are substantially parallel.

The top end of each elongated member further includes at least one handle projecting orthogonally away therefrom. In some embodiments the top end of each elongated member further includes one of the handles projecting rearwardly therefrom, and one of the handles projecting forwardly therefrom.

In use, with the person gripping the at least one handle of each elongated member, the elongated members may be pulled mutual apart to open the two-part hose holder to at least partially encircle the hose, whereupon the elongated members are then pushed together to close the two-part hose holder about the hose.

The present invention is a device that allows a septic or concrete hose to be manipulated even when a heavy material is flowing through the hose. The present invention allows a person to manipulate the position and orientation of the hose without stooping or bending over, and is made from a strong material and is well-suited for gripping the hose. The present device includes a provision to adjust the height of the implement to fit the user. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Figure 1:
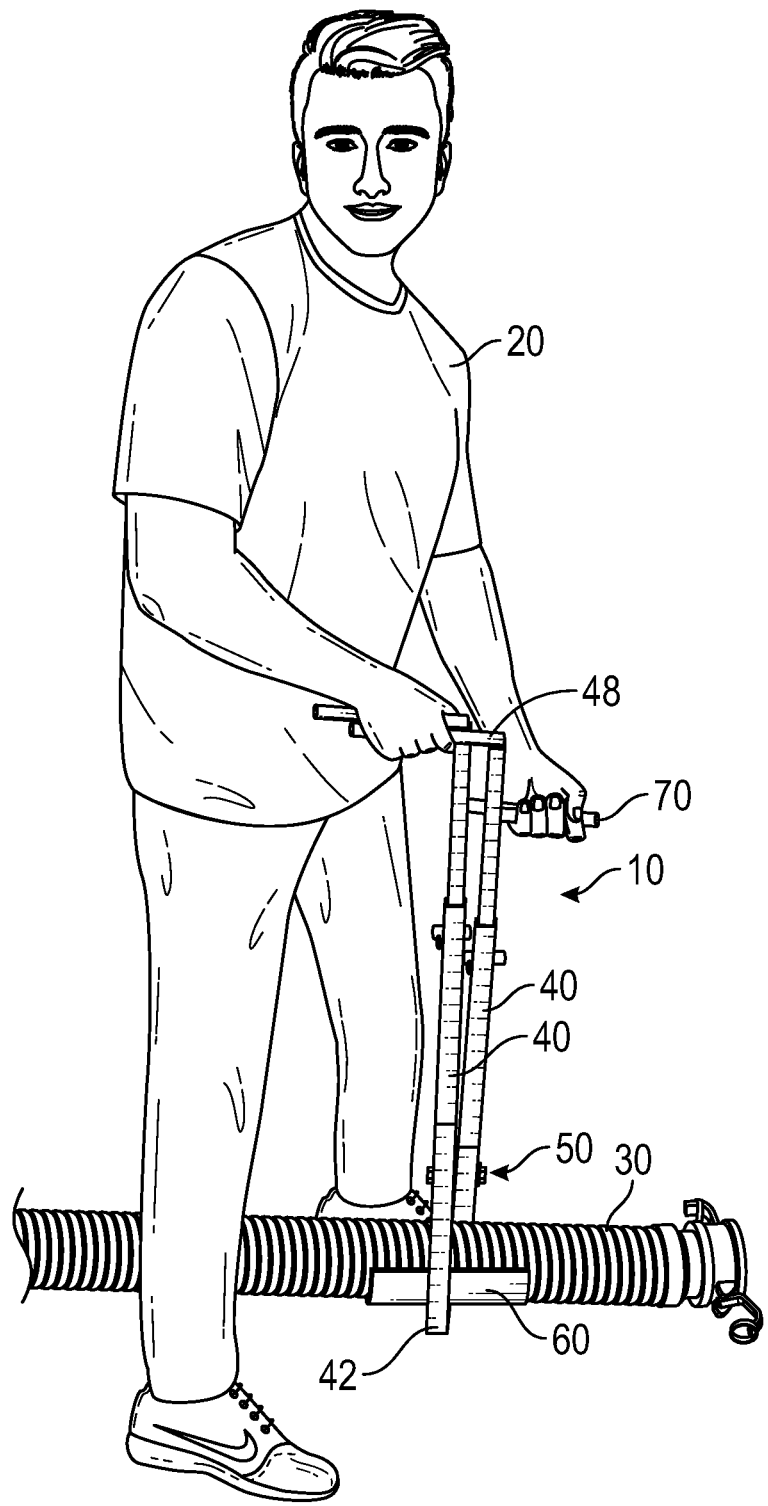
FIG. 1 is a perspective view of the invention, illustrating a person manipulating a hose with an implement of the invention.

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

FIGS. 1-4 illustrate an implement 10 for a person 20 to manipulate a hose 30, such as a septic hose 30. The implement 10 provides for the person 20 to manipulate the hose 30 in such a way as to not being required to bend down or stoop to engage the hose 30 with the implement 10.

Two elongated members 40 each have a top end 48, a bottom end 42, and a pivot aperture 45 traversing through the elongated member 40. Preferably each elongated member 40 is made with a square steel stock material, or other similarly-rigid and strong pipe or rod material. Preferably each elongated member 40 further includes a telescoping portion 90 between the top end 48 and the pivot aperture 45 thereof. The telescoping portion 90 and the rest 80 of the elongated member 40 each have a plurality of cooperative adjustment apertures 91 selectively fastened together with an adjustment pin 92 (FIGS. 3 and 4) to adjust the length of each of the elongated members 40. In this manner the person 20 can pull the adjustment pin 92 away from one of the elongated members 40, adjust the telescoping portion 90 to a desired position, and then reinsert the adjustment pin 92 into the cooperative adjustment apertures 91 of the telescoping portion 90 and the rest 80 of the elongated member 40 to lock the telescoping portion into the desired position for an overall desired height of the elongated member 40. The process can then be repeated with the other elongated member 40.

A pivot rod 50 traverses the pivot apertures 45 of each elongated member 40 such that each elongated member 40 is pivotally joined at the pivot rod 50. Such a pivot rod 50 is preferably a bolt with a nut, or other mechanical fastening arrangement. The pivot rod 50 is rigid and strong, preferably made from a metal material such as steel or iron. A spacer (not shown) may be included with the pivot rod 50 so that when the bolt or nut is tightened, the pivot rod 50 does not frictionally bind or prevent the elongated members 40 from rotating with respect to each other.

Figure 2:
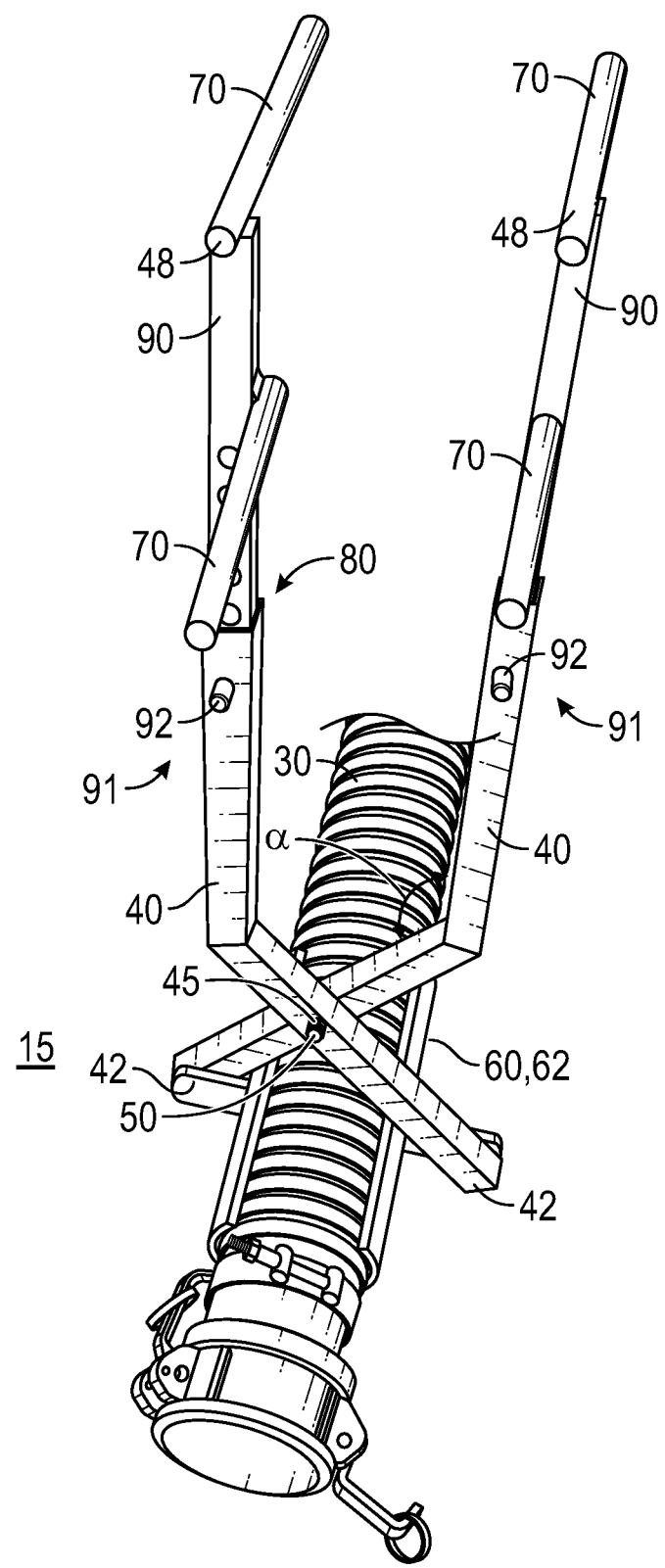
FIG. 2 is an alternate perspective view of the invention.
Figure 5:
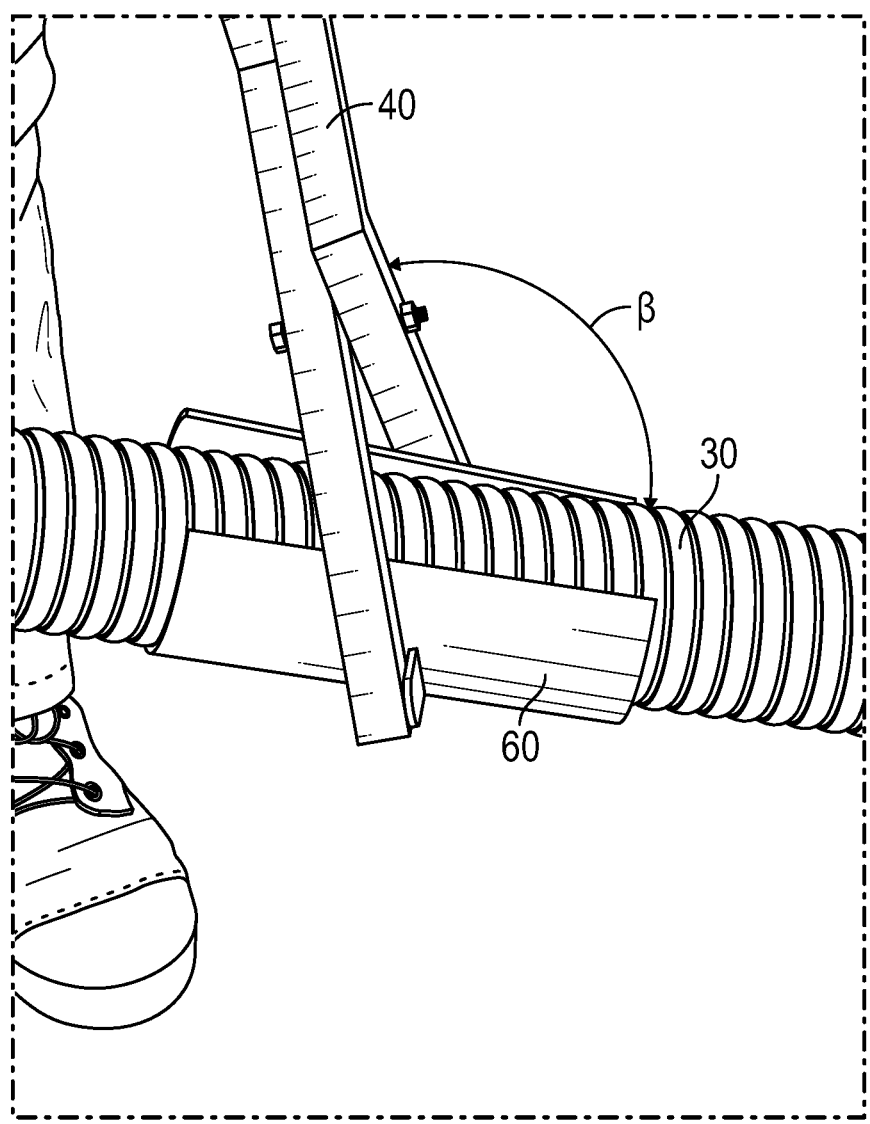
FIG. 5 is a partial perspective view of an alternate embodiment of the invention.

A two-part hose holder 60 comprises two elongated arcuate members 62 each fixed with the bottom end 42 of one of the elongated members 40 such that concave surfaces 63 of each arcuate member 62 are mutually opposingly disposed. In some embodiments the two-part hose holder 60, when engaged with the hose 30, the two-part hose holder 60 and the bottom end 42 of each of the elongated members 40 are flush at a bottom side of the implement 10, that is, the bottom end 42 of each elongated member 40, such that the implement 10 can stand upright on a horizontal support surface 15 (FIG. 2). When supported in such a manner on the horizontal support surface 15, the elongated members 40 are stationary and not urged to either open or close the two-part hose holder 60. Preferably the elongated arcuate members 62 are made from the same material or similar material as the elongated members 40, such as steel or iron metal material. The elongated arcuate members 62 may be affixed with the elongated members 40 by welding, with mechanical fasteners such as bolts and nuts or rivets (not shown), or the like. The elongated arcuate members 62 may be affixed with the elongated members 40 such that the elongated arcuate members 62 are orthogonal to the elongated members 40, or alternately at an angle β of 35 to 45-degrees (FIG. 5) to facilitate handling the hose 30 in in-ground applications, such as with a septic hose 30.

Figure 3:
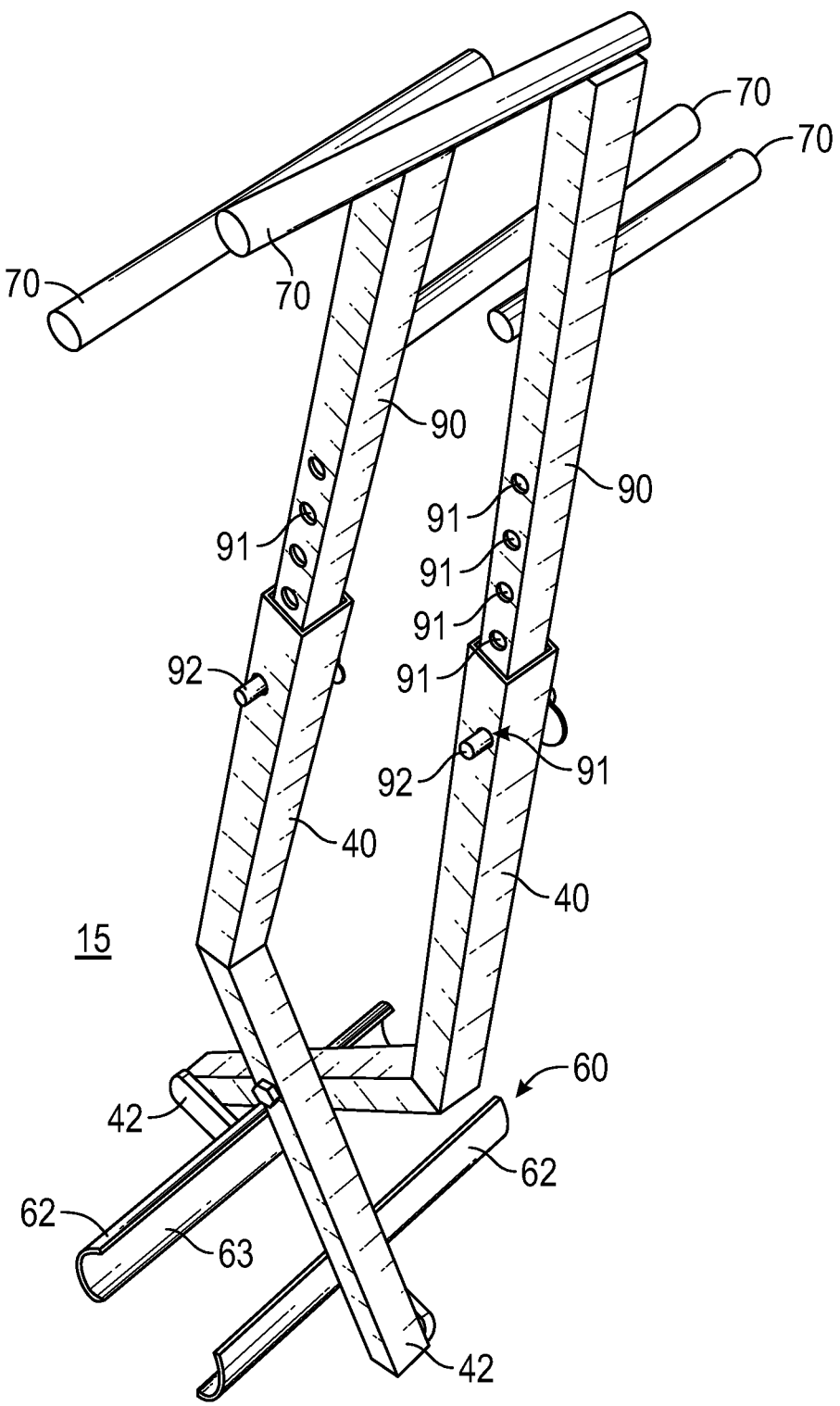
FIG. 3 is a top perspective view of the invention.
Figure 4:
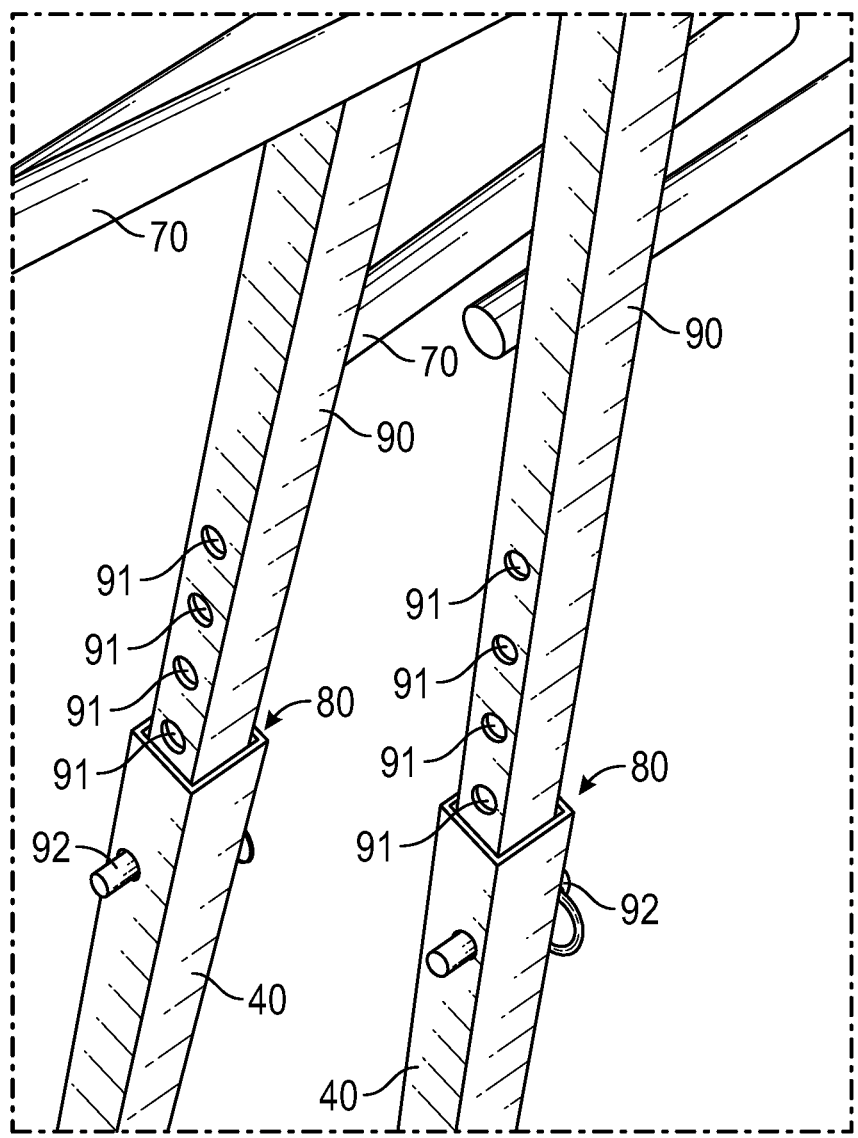
FIG. 4 is a partial top-perspective view of the invention, illustrating an adjustable telescoping portion of the invention.

The top end 48 of each elongated member 40 further includes at least one handle 70 projecting orthogonally away therefrom. In some embodiments the top end 48 of each elongated member 40 further includes one of the handles 70 projecting rearwardly therefrom. In some embodiments the top end 48 of each elongated member further includes one of the handles 70 projecting forwardly therefrom. In some embodiments the top end 48 of each elongated member 40 further includes one of the handles 70 projecting rearwardly therefrom, and one of the handles 70 projecting forwardly therefrom (FIG. 3). Preferably the handles 70 are made from a rigid steel or iron metal material and welded or otherwise affixed with the elongated members 40. In some embodiments a foam or other cushion material (not shown) may be applied to the handles 70.

In use, with the person 20 gripping the at least one handle 70 of each elongated member 40, the elongated members 40 may be pulled mutual apart to open the two-part hose holder 60 to at least partially encircle the hose 30, whereupon the elongated members 40 are then pushed together to close the two-part hose holder 60 about the hose 30 to engage the hose 30. While holding the elongated members 40 together, the hose 30 may then be manipulated by the person without stooping or bending down.

Preferably each elongated member 40 is angled proximate the pivot aperture 45 thereof such that when the two-part hose holder 60 is engaged with the hose 30, the top ends 48 of the elongated members 40 are substantially parallel (FIG. 2). The elongated members 40 may be angled at an angle α of between 30-degrees and 50-degrees, for example (FIG. 2).

Figure 6:
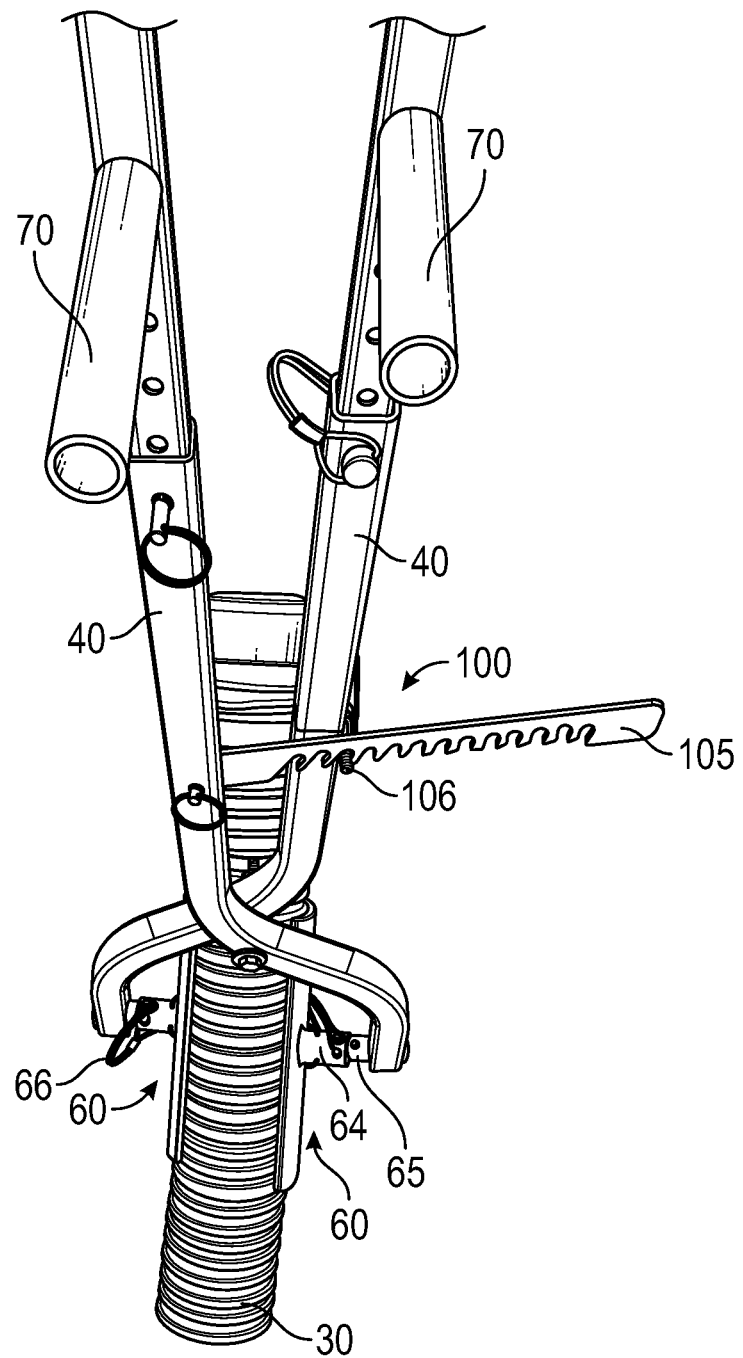
FIG. 6 is a partial top-perspective view of the invention, illustrating a toothed locking bar of the invention.

In preferred embodiments, each elongated arcuate member 62 is rotationally fixed at a sleeve 64 (FIG. 6) with a post 65 of the bottom end 42 of one of the two elongated members 40, whereby the hose 30 may be held by the person 20 in the implement 10 at a preselected angle with respect to the elongated members 40. Preferably the rotational position of each elongated arcuate member may be locked with a pin 66 through the sleeve 64 and the post 65, although other rotational locking mechanisms can be utilized to gain this benefit. In this manner the hose 30 may be angled with respect to the implement 10 for more comfortable carrying or positioning by the person 20. Further, each elongated arcuate member 62 may be moved away from the elongated member 40 or towards the elongated member 40 and locked in place, so as to accommodate hoses 30 of varying diameters.

The elongated members 40 may preferably be fixed together with a locking mechanism 100 (FIG. 6) that includes a toothed locking bar 105 pivotally fixed with one of the elongated members 40, the toothed locking bar 105 configured to selectively engage a post 106 of the other elongated member 40. As such, to maintain the implement 10 in a closed position securing the hose 30, the toothed locking bar 105 is pressed downward to engage the post 106, whereby the person 20 may let go of the implement 10 while the hose 30 is still held thereby. To release the implement 10 the toothed locking bar 105 is pulled upward away from the post 106.

While a particular form of the invention has been illustrated and described, it will be apparent that various modifications can be made without departing from the spirit and scope of the invention. For example, the figures illustrate the elongated handles 40 being made from a square metal stock material, but other strong, rigid, preferably metallic materials can be used. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms.

Accordingly, the inventor reserves the right to add additional claims after filing the application to pursue such additional claim forms for other aspects of the invention.

What is claimed is:

1. An implement for a person to manipulate a hose, comprising:

two elongated members each having a top end, a bottom end, and a pivot aperture;

a pivot rod traversing the pivot apertures of each elongated member such that each elongated member is pivotally joined at the pivot rod;

the bottom end of each elongated member including a post projecting therefrom;

a two-part hose holder comprising two elongated arcuate members each rotationally fixed at a sleeve with the post of the bottom end of one of the elongated members such that concave surfaces of each elongated arcuate member are opposingly disposed, wherein a rotational position of each elongated arcuate member is selectively adjustable such that each elongated arcuate member may be positioned at a preselected angle with respect to the elongated members;

the top end of each elongated member including at least one handle projecting orthogonally away therefrom;

whereby with the person gripping the at least one handle of each elongated member, the elongated members may be pulled mutually apart to open the two-part hose holder to at least partially encircle the hose, the elongated members then being pushed together to close the two-part hose holder about the hose to engage the hose, the hose then being manipulated by the person while holding the handles together.

2. The implement of claim 1 wherein the rotational position of each elongated arcuate member may be locked with a pin through the sleeve and the post.

3. The implement of claim 1 wherein each elongated member is angled proximate the pivot aperture such that when the two-part hose holder is engaged with the hose, the top ends of the elongated members are substantially parallel.

4. The implement of claim 1 wherein each elongated member is made with a square steel stock material.

5. The implement of claim 4 wherein each elongated member includes a telescoping portion between the top end and the pivot aperture thereof, the telescoping portion and the rest of the elongated member each having a plurality of cooperative adjustment apertures selectively fastened together with an adjustment pin to adjust an overall length of each of the elongated members.

6. The implement of claim 1 wherein the elongated members may be fixed together with a locking mechanism that includes a toothed locking bar pivotally fixed with one of the elongated members, the toothed locking bar configured to selectively engage a locking post of the other elongated member.

* * * * *